United States Patent
Beller et al.

(10) Patent No.: US 7,348,905 B2
(45) Date of Patent: Mar. 25, 2008

(54) DEVICE FOR TREATING AUDIO SIGNALS, ESPECIALLY FOR TREATING AUDIOPHONATORY DISORDERS

(75) Inventors: Isi Beller, 6 rue de Savoie, F-75006, Paris (FR); Christophe Viala, Sanary sur Mer (FR)

(73) Assignee: Isi Beller, Paris (FR)

( * ) Notice: Subject to any disclaimer, the term of this patent is extended or adjusted under 35 U.S.C. 154(b) by 0 days.

(21) Appl. No.: 10/584,309

(22) PCT Filed: Dec. 23, 2004

(86) PCT No.: PCT/FR2004/003365

§ 371 (c)(1),
(2), (4) Date: Dec. 26, 2006

(87) PCT Pub. No.: WO2005/064570

PCT Pub. Date: Jul. 14, 2005

(65) Prior Publication Data

US 2007/0146172 A1    Jun. 28, 2007

(30) Foreign Application Priority Data

Dec. 24, 2003   (FR) .................................. 03 15379

(51) Int. Cl.
   *H03M 1/00* (2006.01)
(52) U.S. Cl. ...................... 341/110; 341/100
(58) Field of Classification Search ......... 341/100–119
   See application file for complete search history.

(56) References Cited

U.S. PATENT DOCUMENTS 4,708,657 A * 11/1987 Beller et al. ................. 434/185
4,895,519 A * 1/1990 Beller et al. ................. 434/185
5,573,403 A 11/1996 Beller et al.
6,629,844 B1 10/2003 Jenkins et al.

OTHER PUBLICATIONS

Apoux, Frederic et al., "Temporal envelope expansion of speech in noise for normal-hearing and hearing-impaired listeners: effects on identification performance and response times", Hearing Research, vol. 153, No. 1/2, pp. 123-131, 2001.

* cited by examiner

*Primary Examiner*—Lam T. Mai
(74) *Attorney, Agent, or Firm*—Oblon, Spivak, McClelland, Maier & Neustadt, P.C.

(57) ABSTRACT

A device for digital treatment of audio signals, especially for treating patients with audiophonatory disorders. The device includes an analog audiofrequency signal input, an analog-digital encoder, an envelope detector, a digital limiter, a multiplier, a synthesizer, and a digital-analog converter. The analog-digital encoder reflects an input analog audiofrequency signal by a first sequence of digital values; the envelope detector establishes, from the first sequence of digital values, a second sequence of digital values reflecting the envelope of the input audiofrequency signal; the digital limiter establishes a third sequence of defined digital values, from the second sequence of digital values; the multiplier establishes a sequence of modulated emission frequency values according to values of the third sequence of digital values; the synthesizer elaborates a digital audio signal from the sequence of emission frequency values; and the digital-analog converter produces an output analog signal from the digital audio signal.

9 Claims, 1 Drawing Sheet

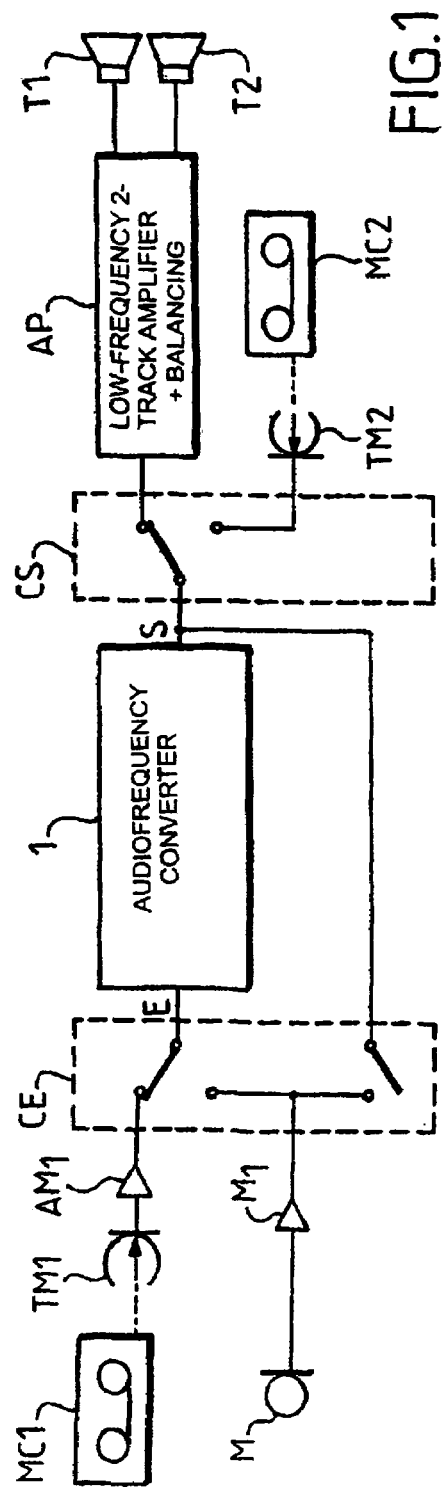
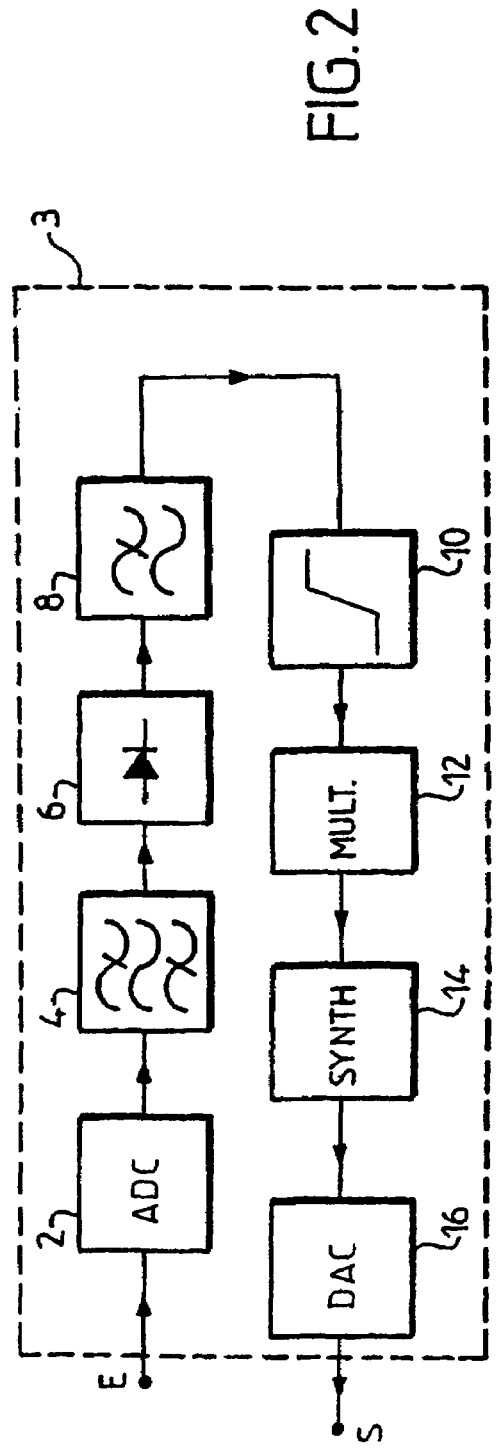

DEVICE FOR TREATING AUDIO SIGNALS, ESPECIALLY FOR TREATING AUDIOPHONATORY DISORDERS

The invention relates to aids for the treatment of audio-phonatory and audio-verbal disorders occurring in certain subjects, most often young children.

Devices for the auditory treatment of subjects affected by audio-phonatory disorders are already known. In particular, FR-A-2686442 proposes an apparatus adapted to develop, from an audiofrequency input signal, a parametric signal the amplitude and/or frequency of which vary as a function of the logarithm of the frequency and/or amplitude of the input signal. The parametric signal is produced as an analogue signal.

Various factors, including the cost of the equipment, its bulk and convenience of use, mean that it is desirable to carry out the treatment in digital form. This would make it possible in particular to use data files contained on a hard disc, instead of the magnetic tapes and compact discs used in the prior art. However, the transition to digital has come up against serious difficulties: non-linearity of treatment and the difficulty of correcting certain effects caused by sampling and digitisation.

The present invention makes it possible to achieve progress in this direction.

To this end the invention provides a device comprising an analogue audiofrequency signal input followed by an analogue-digital encoder, then an envelope detector, a digital limiter, a multiplier, a synthesiser and finally a digital-to-analogue converter, such that the analogue-digital encoder is designed to reflect the analogue audiofrequency input signal by a first sequence of digital values, the envelope detector is arranged to establish, from the first sequence of digital values, a second sequence of digital values reflecting the envelope of the audiofrequency input signal, the digital limiter is designed to establish a third sequence of limited digital values from the second sequence of digital values, the multiplier is arranged to establish a sequence of modulated emission frequency values according to the values of the third sequence of digital values, the synthesiser is arranged to develop a digital audio signal from the sequence of emission frequency values, and the digital-to-analogue converter is arranged to produce an analogue output signal from the digital audio signal.

The device according to the invention thus makes it possible to obtain an analogue output signal the frequency of which is modulated as a function of the analogue audiofrequency input signal, which is generated digitally.

Further features and advantages of the invention will be apparent from the detailed description that follows, and the accompanying drawings, wherein:

FIG. 1 is a diagram showing an apparatus for assisting the treatment of audio-phonatory disorders, according to the prior art, and FIG. 2 is a functional diagram of the treatment apparatus according to the invention.

Annex 1 sets out the mathematical laws used in the device according to FIG. 2.

The drawings and annex essentially contain elements of an established nature. They may therefore serve not only to supplement the invention but also contribute to a definition thereof, as the case may be.

FIG. 1 shows the apparatus for treating audio-verbal disorders according to FR-A-2686442, wherein an audiofrequency converter 1 is capable of generating, from an audiofrequency signal applied to its input E, a parametric signal delivered at its output S the amplitude and/or frequency of which vary as a function of the logarithm of the frequency and/or amplitude of the input signal The parametric output signal is generated in analogue manner.

The audiofrequency converter 1 is mounted between an input switch CE and an output switch CS. The switch CE enables the input E of the converter to be connected either to the read output of a magnetic head TM1 of a cassette tape recorder MC1, preferably of high sound quality, or to the output of an audio compact disc reader, or to the output of a microphone M, again of high quality. Both outputs may be amplified by pre-amplifiers AM1 and M1.

The output S of the audiofrequency converter may be applied by the switch CS either to a two-track sound reproduction channel or to the recording input of a magnetic head TM2 of a cassette tape recorder MC2, which may, furthermore, be the same as the cassette tape recorder MC1.

The switches CE and CS provide a direct connection between the microphone M, the amplifier A and the tape recorder MC2.

The sound reproduction channel A comprises adjustments for individual levels and balancing for each track, associated with precise measuring means, and outputs through electro-acoustic transducers, for example loudspeakers T1, T2 intended for the left and right ears, respectively, of the subject. A headset may also be provided.

In order to obtain better processing of the audiofrequency input signal and make the best use of recent digital media, the device according to the invention proposes that the audiofrequency converter 1 in FIG. 1 be replaced by the processing device 3 shown in FIG. 2, which generates the parametric output signal digitally.

In order to do this the digital processing device according to the invention is adapted to be capable of receiving at its input E an analogue audiofrequency input signal which may be a combination of analogue signals coming from the subject to be treated and the therapist.

The analogue audiofrequency input signal is delivered to the input of an analogue-digital encoder 2, which determines at regular time intervals (sampling period) $\Delta T$, the value of the amplitude S(i) of the signal delivered to the input and the code digitally. The analogue-digital encoder 2 produces at its output a sequence of digital amplitude values S(i) reflecting the signals supplied at the input, i.e. the analogue audiofrequency input signal.

In a preferred embodiment, a soundcard placed in a personal computer acts as an analogue-digital encoder 2. The sampling period $\Delta T$ is then fixed by the technical features of the soundcard. For example, a sampling frequency of 48 kilohertz, i.e. a sampling period $\Delta T$ of approximately 0.02 milliseconds, is standard on the soundcards currently available on the market.

In this same embodiment the input E of the device according to the invention is one of the inputs available on the soundcard, currently a line input or a microphone input.

The sequence of digital values S(i) obtained at the output of the analogue-digital encoder 2 is then delivered to the input of a digital pass-band filter 4 which blocks frequencies below a first cut-off frequency FC1 and frequencies above a second cut-off frequency FC2. The pass-band filter may be formed by two Butterworth filters arranged in a cascade: one high pass filter with a cut-off frequency FC1 followed by a low pass filter with a cut-off frequency FC2. In a preferred embodiment, the first cut-off frequency FC1 is approximately 230 Hz, whereas the second cut-off frequency FC2 is around 3200 Hz.

In this embodiment, the mean fundamental frequency of the voice being around 120 Hz for men and 210 Hz for women, the digital pass-band filter 4 is broad enough to allow the data contained in the audiofrequency input signal to pass through if it contains language. The middle of the band of frequencies defined by the pass-band filter 4 is well above the estimated frequency of an audiofrequency signal containing language. In fact, the pass-band filter 4 filters a large proportion of bass frequencies and allows through a large proportion of treble frequencies.

The sequence of digital amplitude values S(i) obtained at the output from the pass-band filter 4, is applied to the input of an envelope detector 6, which carries out, on the sequence of digital values of amplitude S(i) a digital treatment according to the law A1 shown in the annex. The envelope detector 6 associates, with each digital amplitude value S(i), a digital envelope amplitude value Se(i) as being the largest value in a group formed by the absolute value of the digital amplitude value S(i) and the absolute value of the previous digital envelope amplitude value Se(i-1) affected by a coefficient Kd. The value of the coefficient Kd is determined using the formula A2 shown in the annex, which specifies taking the coefficient Kd equal to the exponential of the inverse of the ratio of the sampling period ΔT over the value of a selected demodulation period Td. The value of the demodulation period Td can be adjusted. For example, the demodulation period Td may be taken to be equal to 0.04 seconds.

Formula A1 in the annex is a classic formula of a maximum detector, modified by the introduction of the coefficient Kd, the function of which is to fix the desired frequency range for the envelope signal obtained at the output from the envelope detector 6. Formula A2 in the annex, relating to the calculation of the coefficient Kd, thus makes it possible to select the value for the demodulation period Td in relation to the band of frequencies in which the output of the envelope detector 6 is meant to be contained.

A digital low pass filter 8 is applied to the output signal of the envelope detector 6, which blocks frequencies higher than a third cut-off frequency FC3, which is adjustable. In a preferred embodiment, the low pass digital filter 8 is produced by means of a low pass Butterworth filter of the order 1 with a cut-off frequency FC3 of around 24 Hz.

The low pass filter 8 is intended to attenuate the rapid modulations of the signal supplied to its input. The signal obtained at the output of the low pass filter 8 takes account of a dragging effect which is needed to prevent the signal obtained at the output from the envelope detector 6 from being too "chopped".

The sequence of filtered digital values for the envelope amplitude Sϵ(i), obtained at the output of the digital low pass filter 8, is then supplied to the input of a limiter 10, which provides at its output a sequence of limited digital modulation values S1(i), according to formula A3 in the annex. Each digital modulation value S1(i) is calculated as being the ratio, raised to the power of a coefficient K1, of the digital filtered value of the envelope amplitude Sϵ(i) over a selected threshold amplitude value s. The threshold amplitude value s is adjustable.

The value of the coefficient K1 is determined by formula A4 in the annex as being the inverse of the ratio of the logarithm of a ratio of a selected minimum emission frequency F1 and maximum emission frequency F0, over the logarithm of the threshold amplitude value s.

The minimum emission frequency F1 is adjustable. Advantageously, it is selected to be very much higher than the basic frequency of the analogue audiofrequency input signal. In a preferred embodiment, the minimum emission frequency F1 is selected to be around 4000 Hz, considering that the fundamental frequency of a signal coming from a human voice is around 210 Hz for women and 120 Hz for men.

The maximum emission frequency F0 is adjustable. It is chosen to be above the ultrasonic limit of the subject being treated, i.e. above the highest frequency audible by the subject. The ultrasonic limit is a datum which depends on the subject. For example, in young children, an ultrasonic limit of 20 kilohertz is normal whereas in older subjects it may not exceed 10 kilohertz.

The value of the threshold amplitude s is chosen to be always greater than 0.01, for reasons which will be explained in more detail hereinafter. In a preferred embodiment the threshold amplitude value s is selected to be around 0.03.

The sequence of digital modulation values S1(i) is then submitted to the input of a multiplier 12 which determines a sequence of modulated emission frequency values F(i) according to formula A5 of the annex. A digital value for the modulated emission frequency F(i) is calculated as the product of the maximum emission frequency F0 and the corresponding digital modulation value S1(i), if said product is below the maximum emission frequency F0. Otherwise, the digital value F(i) is fixed to be equal to the value of the maximum emission frequency F0. The multiplier 12 is thus able to provide a sequence of digital values for emission frequencies F(i) modulated according to the values of the sequence of digital modulation values S1(i) obtained at the output from the limiter 10.

The digital emission frequency values F(i) depend, according to formula A5 in the annex, on the digital modulation values S1(i), which are a function of the filtered digital envelope amplitude values Sϵ(i), i.e. a function of the digital envelope amplitude values Se(i), which in turn reflect the amplitude of the envelope of the input analogue audiofrequency signal. Consequently, the variations in the digital emission frequency values F(i) take account of the variations in amplitude of the envelope of the analogue input audiofrequency signal. In particular, when the amplitude of the envelope of the analogue input audiofrequency signal is great, i.e. for a high sound volume, the digital value of the corresponding emission frequency will be low. Conversely, the closer the amplitude of the envelope of the analogue input audiofrequency signal to the threshold amplitude value s, the higher the modulated emission frequency F(i).

According to formulae A3, A4 and A5 in the annex, the logarithm of the modulated emission frequency F(i) is a linear function of the logarithm of the value of the amplitude of the corresponding filtered envelope Sϵ(i). Now, it is known that the human ear is sensitive to frequencies and amplitudes in a logarithmic manner. The subject's perception of modulated emission frequencies F(i) takes account, in a perfectly equivalent manner, of variations in amplitude of the analogue audiofrequency input signal.

Using formula A3 shown in the annex, the limiter 10 determines the digital modulation values S1(i) such that the digital modulated emission frequency values F(i) obtained at the output from the multiplier 12 are always contained within a range of frequencies bounded by the values of minimum emission frequency F1 and maximum emission frequency F0.

In particular, when a digital envelope amplitude value $S_e(i)$ is equal to the threshold amplitude value s, the digital modulation value $S1(i)$ calculated by the limiter 10 with the aid of formula A3 shown in the annex, is equivalent to 1, which means that the value of the corresponding modulated emission frequency $F(i)$ assumes the value of the maximum emission frequency F0. For a filtered digital envelope amplitude value $S_\epsilon(i)$ below the threshold amplitude value s, the corresponding digital modulation value $S1(i)$ is higher than the value 1, which implies that the digital value of the modulated emission frequency $F(i)$ assumes the value of the maximum emission frequency F0, which is inaudible to the subject because it is chosen to be above the ultrasonic limit, as described previously.

Thus, the modulated emission frequency values $F(i)$ do not take account of variations in the amplitude of the envelope of the analogue audiofrequency input signal, for amplitudes below the threshold amplitude value s. The threshold value s thus represents a sound amplitude value below which it is considered that the input audiofrequency analogue signal does not represent any information worthy of being provided by means of a frequency modulation. It may be thought that the choice of the threshold amplitude value s fixes the desired detail level in the use of the apparatus according to the invention. In fact, the higher the threshold amplitude value s, the less the modulation will take account of details in the analogue input audiofrequency signal.

Preferably, the threshold amplitude value s is taken to be above 0.01, considering that this value corresponds to the limit value which separates noise from language.

The assembly consisting of the envelope detector 6, the limiter 10 and the multiplier 12 thus associates a corresponding range of emission frequencies to an amplitude range of the envelope of the analogue input audiofrequency signal.

The synthesiser 14 generates, for each digital emission frequency value $F(i)$, a digital amplitude signal which is chosen to be constant and adjustable, the basic frequency of which corresponds to the digital value of the emission frequency $F(i)$. For each basic frequency defined hereinbefore, the synthesiser 14 determines the number of harmonics which it can generate, taking into account the upper frequency limit imposed by the sampling frequency (Shannon theorem), which is the inverse of the sampling period $\Delta T$. The synthesiser 14 produces the harmonics previously determined by adding together the Fourier sequence of a square wave signal, by applying, to each n-ranked harmonic, the coefficient $1/n$ when n is even and the coefficient $-1/n$ when n is odd.

Although the amplitude of the digital signal produced by the synthesiser 14 is constant and independent of the modulated emission frequency $F(i)$, the amplitude perceived by the subject is itself dependent on the modulated emission frequency $F(i)$ on account of the form of the human audible spectrum. In particular, the higher the modulated emission frequency $F(i)$, the lower the amplitude perceived by the subject.

The digital audio signal obtained at the output of the synthesiser 14 is then applied to the input of a digital-to-analogue converter which produces, from said digital audio signal, an analogue output signal which can be sent to the patient who is to be treated through a headset or a sound booth. Advantageously, the digital-to-analogue converter can be a soundcard inserted in a personal computer. In a preferred embodiment, the digital-to-analogue converter function is provided by the same soundcard that acts as an analogue-to-digital converter 2, described hereinbefore.

The analogue output signal is perceived by the patient to be quite separate from the analogue input audiofrequency signal as its fundamental is much higher than the frequency of the voice, as indicated above. This is important when it is decided to associate the analogue input audiofrequency signal and the analogue output signal, as described hereinafter. In this case, the choice of cut-off frequencies FC1 and FC2 of the pass-band filter 4 determines the range of frequencies available for the analogue output signal.

As the analogue output signal is produced with several of its harmonics, it is more pleasant for the patient being treated to hear.

In humans, "phonological awareness" is based particularly on automatic responses and their cognitive integration (semantic and syntactical). The treatment of patients suffering from audio-verbal disorders, i.e. people in whom these automatic responses have not been properly acquired, consists essentially of re-educating them using the apparatus according to the invention enabling them to acquire these automatic responses once again.

In a first stage of re-education, a single parametric sound is played to the patient, this sound being obtained by delivering to the input of the apparatus according to the invention sound samples consisting of voice or music. These sound samples may come from the therapist via a microphone connected to the input E of the apparatus according to the invention. In a preferred embodiment, the sound samples come from recordings stored in a computer memory and supplied to the apparatus according to the invention through a software recorder capable of playing sounds, notably in the MP3 compression format. In this particular embodiment the computer comprises a soundcard which integrates the functions of an analogue-digital encoder and digital-to-analogue converter. In this first re-education stage it may be advantageous to use music as the input into the apparatus according to the invention in order to accustom the subject to the parametric sound.

In a second stage of the treatment, the patient is played a parametric sound on its own followed by the original natural sound as supplied to the input of the apparatus according to the invention. The original natural sound is a message segment (a very short sentence) first of all broken up into phonemes, then in a second stage into syllables and finally into syntactical elements.

A third phase of the treatment consists in segmenting the parametric sound by alternating mute periods (silence) and sound periods (parametric sound). According to a first method the durations of the times are fixed, the mute times generally being longer (0.5 s for example) then the sound times (0.3 s, for example). It is possible to emphasise the alternation between mute times and sound times by playing a characteristic sound signal (typically a "beep"). One advantage of the present invention is that it bases this alternation on the sound emitted by the patient. The apparatus flips from a sound period to a mute period when a parameter attains a selected value. For example, it is possible to switch to a mute period when the power or frequency of the sound emitted by the patient reaches a selected level. Another parameter may be linked to the speech rhythm: for example, if a vowel is pronounced too long, the apparatus switches to a mute period.

The fourth phase of re-education is called the active phase as the subject repeats what he hears. It starts with pre-recorded words spoken in clear, with intervals allowing the patient to repeat each word. The pre-recorded words are fed into the apparatus according to the invention together with the repeated words. In the headset the subject receives the parametric signal and the natural signal. It is useful to work in stereo by sending the parametric signal to the left ear and the natural signal to the right ear, corresponding to the functional lateralisation of the hemispheres of the brain (dichotic listening).

In a fifth phase of re-education the subject repeats what he hears on the one hand and reads what he is saying on the other hand.

In the sixth phase there is a mixture of guided reading according to the method described above and free reading with pronunciation of the text being read, and hearing the text being read, in the form of a mixture of a parametric signal and the natural signal.

Finally, in a seventh phase, the patient writes down what he is hearing and he is allowed time to reread and correct.

Progressively, the parametric signal is eliminated completely.

In a preferred embodiment the soundcard described above integrates a mixing function, not described here as it is known in the art, which enables a mixture of the analogue input audiofrequency signal and the analogue output signal to be obtained at the output, but also allows the analogue audiofrequency input signal to be made into a combination of signals coming from a reading source, the therapist and the subject.

The production of the parametric output signal in digital form also provides greater flexibility of use of the apparatus according to the invention and greater precision in treatment. This also makes it possible to take full advantage of current digital supports such as CDs but also data supports such as read-only memories and the MP3 compression format so as to build up a database of sound samples.

The apparatus according to the invention has been described herein for use in the treatment of audio-verbal disorders but may also be used as the basis for a method of learning foreign languages. Furthermore, the apparatus according to the invention may be adapted to the treatment of audio-verbal disorders in languages other than French.

The invention is not restricted to the embodiments described hereinbefore, purely by way of example, but encompasses all the variants which might be envisaged by the skilled man.

Annex
A1. $S\epsilon(i)=\max\{|S(i)|,|Kd\times S\epsilon(i-1)|\}$
A2. $Kd=\exp[-\Delta T/Td]$
A3. $S1(i)=(S\epsilon(i)/S)^{K1}$
A4. $K1=-\ln(F1/F0)/\ln(s)$
A5. $F(i)=\min(F0\times S1(i),F0)$

The invention claimed is:

1. A digital processing apparatus of audio signals, configured for treatment of subjects suffering from audio-phonatory disorders, comprising:
    an analog audiofrequency signal input configured to provide an audiofrequency input signal;
    an analog-digital encoder;
    an envelope detector;
    a digital limiter;
    a multiplier;
    a synthesizer; and
    a digital-to-analog converter,
    wherein the analog-digital encoder is configured to reflect the analog audiofrequency input signal by a first sequence of digital values;
    wherein the envelope detector is configured to establish, from the first sequence of digital values, a second sequence of digital values reflecting an envelope of the audiofrequency input signal;
    wherein the digital limiter is configured to establish a third sequence of limited digital values, from the second sequence of digital values;
    wherein the multiplier is configured to establish a sequence of modulated emission frequency values according to values of the third sequence of limited digital values;
    wherein the synthesiser is configured to provide a digital audio signal from the sequence of modulated emission frequency values; and
    wherein the digital-to-analog converter is configured to produce an analog output signal from the digital audio signal.

2. A digital processing apparatus according to claim 1, wherein the digital limiter is further configured to establish the third sequence of limited digital values in accordance with a first law laid down so that the modulated emission frequency values are contained between a selected lower frequency value and a selected upper frequency value.

3. A digital processing apparatus according to claim 2, wherein the first law takes into account the values of the third sequence of limited digital values and a chosen threshold amplitude value.

4. A digital processing apparatus according to claim 3, wherein the first law is a function of:
    a threshold value,
    a logarithm of the selected lower frequency value, and
    the a logarithm of the selected upper frequency value.

5. A digital processing apparatus according to claim 4, wherein the first law calculates each value of the third sequence of limited digital values as being the ratio of a value of the second sequence of digital values over the chosen threshold amplitude value raised to a power equal to the ratio of the logarithm of the ratio of the upper selected and lower selected frequency values, over a threshold value.

6. A digital processing apparatus according to claim 2, wherein the multiplier provides the product of the values of the third sequence of limited digital values and the upper selected frequency value.

7. A digital processing apparatus according to claim 2, wherein the upper selected frequency value is selected to be close to a highest frequency audible by the subject by upper values.

8. A digital processing apparatus according to claim 1, wherein for each value of the sequence of modulated emission frequency values, the synthesiser develops a corresponding fundamental frequency signal with at least one harmonic.

9. A digital processing apparatus according to claim 1, further comprising a digital low pass filter between the envelope detector and the digital limiter.

* * * * *